United States Patent
Lin (10) Patent No.: US 11,896,555 B2
(45) Date of Patent: Feb. 13, 2024

(54) SYSTEM AND METHOD FOR COMPOUNDING ERROR PREVENTION

(71) Applicant: Chun Ching Lin, Cincinnati, OH (US)

(72) Inventor: Chun Ching Lin, Cincinnati, OH (US)

( * ) Notice: Subject to any disclaimer, the term of this patent is extended or adjusted under 35 U.S.C. 154(b) by 1 day.

(21) Appl. No.: 17/443,543

(22) Filed: Jul. 27, 2021

(65) Prior Publication Data

US 2023/0032433 A1 Feb. 2, 2023

(51) Int. Cl.
| | |
|---|---|
| *A61J 7/00* | (2006.01) |
| *H04N 7/18* | (2006.01) |
| *G06T 7/62* | (2017.01) |
| *G06T 7/90* | (2017.01) |
| *A61J 1/03* | (2023.01) |
| *A61J 7/02* | (2006.01) |
| *G06V 20/64* | (2022.01) |

(52) U.S. Cl.
CPC ............. *A61J 7/0076* (2013.01); *A61J 1/03* (2013.01); *A61J 7/02* (2013.01); *G06T 7/62* (2017.01); *G06T 7/90* (2017.01); *G06V 20/64* (2022.01); *H04N 7/183* (2013.01); *A61J 2200/70* (2013.01); *A61J 2200/74* (2013.01); *A61J 2205/10* (2013.01); *A61J 2205/20* (2013.01)

(58) Field of Classification Search
CPC ........ A61J 7/0076; A61J 1/03; A61J 2200/70; A61J 2200/74; A61J 2205/10; A61J 2205/20; G06T 7/62; G06T 7/90; G06V 20/64; H04N 7/183
USPC .......................................................... 221/13
See application file for complete search history.

(56) References Cited

U.S. PATENT DOCUMENTS

| | | | | |
|---|---|---|---|---|
| 7,624,894 B2 * | 12/2009 | Gerold | ..................... | G07F 11/44 |
| | | | | 221/124 |
| 7,770,364 B1 * | 8/2010 | Leu | ........................... | B65B 5/06 |
| | | | | 53/317 |
| 9,272,796 B1 * | 3/2016 | Chudy | ................ | G01N 21/9508 |
| 9,345,645 B1 * | 5/2016 | Chernyak | ............... | A61J 7/0084 |
| 11,170,189 B1 * | 11/2021 | West | ..................... | G06K 7/1096 |
| 11,389,378 B1 * | 7/2022 | Calvin | ....................... | A61J 1/03 |
| 2007/0125442 A1 * | 6/2007 | Tribble | .................... | A61J 3/002 |
| | | | | 141/27 |

(Continued)

FOREIGN PATENT DOCUMENTS

| | | | | |
|---|---|---|---|---|
| CN | 115227582 A | * | 10/2022 | ............. B65B 3/003 |
| WO | WO-2006055956 A2 | * | 5/2006 | ......... G07F 17/0092 |

(Continued)

*Primary Examiner* — Rakesh Kumar
(74) *Attorney, Agent, or Firm* — Rosenberg, Klein & Lee (57) ABSTRACT

A system for dispensing and compounding errors prevention is disclosed. The system for dispensing and compounding errors prevention comprises at least one camera for receiving a real-time image of personnel preparing a prescription; a data storage for storing a medication recipe of a corresponding patient; an identification module for determining an identification tag of a drug from a container of the drug or a physical appearance of the drug; a measurement module for determining an amount of the drug being dispensed by the personnel; a comparison module in communication with the identification module and the measurement module for determining whether the amount of the drug being dispensed by the personnel or the identification tag of the drug match the medication recipe; and an output device for outputting a notification to the personnel.

10 Claims, 4 Drawing Sheets

(56) References Cited

U.S. PATENT DOCUMENTS

| | | | |
|---|---|---|---|
| 2007/0189597 A1* | 8/2007 | Limer | G06F 18/00 |
| | | | 382/128 |
| 2012/0041778 A1* | 2/2012 | Kraft | B65D 51/2828 |
| | | | 215/250 |
| 2016/0354283 A1* | 12/2016 | Cho | A61J 7/00 |
| 2017/0057682 A1* | 3/2017 | Chudy | B65B 65/006 |
| 2017/0074717 A1* | 3/2017 | Pilkington | G01G 19/4144 |
| 2020/0345587 A1* | 11/2020 | Aon | A61B 5/14532 |
| 2021/0133955 A1* | 5/2021 | Hirokawa | A61B 3/102 |
| 2022/0020261 A1* | 1/2022 | Kurfirst | A61J 7/0046 |
| 2022/0198338 A1* | 6/2022 | Neumann | G06Q 30/0641 |
| 2022/0406430 A1* | 12/2022 | Haase | G06N 3/09 |
| 2023/0032433 A1* | 2/2023 | Lin | G06T 7/70 |
| 2023/0039581 A1* | 2/2023 | Abouelela | B25J 9/1664 |

FOREIGN PATENT DOCUMENTS

| | | | | |
|---|---|---|---|---|
| WO | WO-2008055194 A2 * | 5/2008 | | B65B 3/003 |
| WO | WO-2018025852 A1 * | 2/2018 | | A61J 1/03 |

* cited by examiner

SYSTEM AND METHOD FOR COMPOUNDING ERROR PREVENTION

FIELD OF THE INVENTION

The present invention is related to medication dispensing and compounding errors prevention; more specifically, a dispensing and compounding error prevention system and method capable of recording, identifying, and intercepting medication dispensing and compounding error in real-time while the medication order is prepared by professional personnel.

BACKGROUND OF THE INVENTION

According to Pharmacy Association of Nova Scotia, medication dispensing includes all the processes necessary to transform a medication order (or prescription) into an individualized medication supply that is both safe and appropriate to patients. And according to the United States Food and Drug Administration, medication compounding is defined as the combination, mixing, or alteration of drug ingredients to create medications tailored to the needs of an individual patient. Although dispensed and compounded drugs are important for treatments for many diseases and medical conditions, there are certainly potential risks associated with the practice of medication dispensing and compounding. For example, a meta-analysis study published in 2018, it showed that the overall community pharmacy dispensing error rate in U.S. was estimated to be 1.5% (95% CI 0.014 to 0.018). In 2012, the outbreak of fungal meningitis occurred among patients who had received epidural spinal injections had affected 753 patients and caused 64 deaths in the United State. This outbreak was a result of a pharmacy who disregarded basic sanitary standards and had not taken corrective measures while performing medication compounding. In 2016, the Cincinnati Children's Hospital Medical Center (CCHMC) reported that among the 421,730 IV doses compounded, there were 3,101 documented errors (an overall error rate of 0.74%). Most of these errors (72.27%) are related to containing incorrect drugs or diluents; the remaining 27.73% of IV compounding errors are related to preparation with the wrong volume (21.51%) or damage to the final product (0.93%). Furthermore, in 2014, the Boston Children's Hospital reported IV compounding error rate of 0.68%. It is estimated by clinical studies that of all the compounding errors, 17% of the IV compounding errors may cause severe conditions in patients; 2% of the IV compounding errors may result permanent patient harm, 2% of the patients who receive the IV may require intervention necessary to sustain life, and 2.8% of the IV compounding errors may cause death.

Additionally, it is reported that the annual costs of IV wasted while preforming compounding may be as high as $440,000 per year for a university level hospital. Other studies show that for a typical university level hospital, there is an estimate of 2,673 IV doses (6.14% of overall IV doses prepared but wasted) prepared but wasted monthly, which is equivalent to a monthly loss of US$60,135 (annually US$721,620).

Evidently, a system and method for dispensing and compounding errors prevention is definitely needed for the medical and pharmaceutical sectors.

SUMMARY OF THE INVENTION

In order reduce the occurrence of dispensing and compounding errors, the present invention disclose system and method capable of recording, identifying, and intercepting medication dispensing and compounding errors in real-time.

In one embodiment of the present invention, the system for dispensing and compounding errors prevention comprises at least one a camera, a data storage, an identification module, a measurement module, a comparison module, and an output device.

The camera is provided for capturing or receiving the real-time images of personnel preparing the prescription. The camera can be provided in plurality quantity so as to receiving the real-time images from different viewing angles. In some embodiments, different cameras can be assigned for different functions. In other embodiments, it is possible to provide a single camera for capturing all the real-time images of the prescription preparation.

The data storage is provided for storing a medication recipe of a corresponding patient. The medication recipe comprises the prescription prescribed to a particular patient. The medication recipe may contain information such as the name and amount of a drug prescribed to the patient. The medication recipe may contain a combination of different names and amount of drugs to be dispensed or compounded. Furthermore, in some embodiments, the medication recipe may further comprise procedures for preparing the prescription. These medication recipes may be formed and provided to the data storage via wire or wireless means after doctors prescribe prescriptions for their respective patients. In some instances, the real-time images of the prescription preparation can also be stored in the data storage for record.

The identification module is provided for obtaining an identification tag of a drug from a container of the drug or a physical appearance of the drug. The identification tag may comprise information such as the name of the drug, the identification number or code of the drug, the physical appearance of the drug . . . etc. The physical appearance of the drug may include the color, size, and shape of a drug. In some embodiments, the identification tag may also include the date of manufacturing of the drug. The personnel can use the identification module to directly scan the container of the drug so as to obtain the identification tag.

In other embodiments, the identification module may be implemented and realized via image recognition system. The image recognition system may be able to identify and recognize texts, symbols, colors, geometric shapes from a still digital image or a stream of real-time images. The identification module is in communication with the camera via wire and wireless means.

The measurement module is provided for determining an amount of the drug being dispensed by the personnel. The amount of the drug is related to a weight of the drug, a volume of the drug, or a tablet number of the drug prescribed.

In other embodiments, the measurement module may be implemented and realized via image recognition system. The image recognition system may be able to identify and recognize texts, symbols, colors, geometric shapes from a still digital image or a stream of real-time images. The measurement module is in communication with the camera via wire and wireless means. The measurement module receives the real-time images and obtains the amount (quantity or volume) of drug dispensed by the personnel.

In some embodiments of the present invention, the system for dispensing and compounding errors prevention in accordance with the present invention further comprise a gesture recognition module. The gesture recognition module is in communication with the camera and recognize the action, gesture, or task performed by the personnel via artificial intelligence aided image recognition system as mentioned above.

In one embodiment of the present invention, the system for dispensing and compounding errors prevention further comprises an indicator. As mentioned earlier, each step of the procedure for preparing the prescription may be associated with adding a particular drug. The indicator provides visual cues to the personnel regarding the location of the particular drug according to the procedures for preparing the prescription contained in the medication recipe.

In some embodiments of the present invention, the identification module and the measurement module are integrally provided for determining the identification tag from the container of the drug, the physical appearance of the drug, or the amount of the drug being dispensed by the personnel based on the real-time images.

The comparison module is in communication with the identification module, the measurement module and the data storage. The comparison module receives the identification tag and information regarding the amount to determine whether the identification tag and amount of the drug match the medication recipe. The comparison module compares the identification tag and amount of the drug to a current active step of the medication recipe to see whether the personnel is processing the correct drug with the correct amount for the current active step.

In some embodiments, the system for dispensing and compounding errors prevention in accordance with the present invention can be implemented through a remote centralized server; and a plurality of cameras and a plurality of output devices are provided at different sites of different medication dispensing and compounding workstations.

In an embodiment of the present invention, the system for dispensing and compounding errors prevention can be implemented via a server and a mobile device.

In an embodiment of the present invention, the system for dispensing and compounding errors prevention comprises a mobile device (AR glasses). The AR glasses is worn by personnel preparing the prescription, the AR glasses comprises at least one camera, for receiving a real-time image of the personnel preparing the prescription. The system for dispensing and compounding errors prevention further comprises a remote server, the remote server is in communication with the AR glasses. The remote server comprises a data storage, an identification module, a measurement module, and a comparison module.

In one embodiment of the present invention, the system for dispensing and compounding errors prevention further comprises an indicator. The indicator may be incorporated with the display (not shown in the figures) of the AR glasses.

DETAILED DESCRIPTION OF THE PREFERRED EMBODIMENTS

Embodiments of the present invention will now be described, by way of example only, with reference to the accompanying drawings.

The system for dispensing and compounding errors prevention 1 in accordance with the present invention can be provided at locations (e.g., community pharmacies, and centralized or decentralized pharmacy in hospitals . . . etc.) where medication dispensing and compounding is performed. The present invention monitors and supervises the dispensing and compounding process or prescription preparation performed by personnel. In one embodiment of the present invention, the system for dispensing and compounding errors prevention 1 can be implemented at the workstation for performing medication compounding; or in another embodiment, some components of the system for dispensing and compounding errors prevention 1 can be installed local to the workstation for performing medication dispensing and compounding and other components are installed remotely. The term "medication" refers to the drug(s) or treatment used to treat or prevent medical condition of a patient. The term "prescription" mentioned in the present disclosure refers to drug (medication) or combination of drugs (medications) given to a specific patient. The term "dispensing" refers to the provision of drugs or medications. The term "compounding" in the present disclosure refers to the process of combining, mixing, or altering drugs to create medication for the specific patient. The terms "preparing" or "preparation" refer to dispensing or compounding medication; these terms are used interchangeably.

Figure 1:
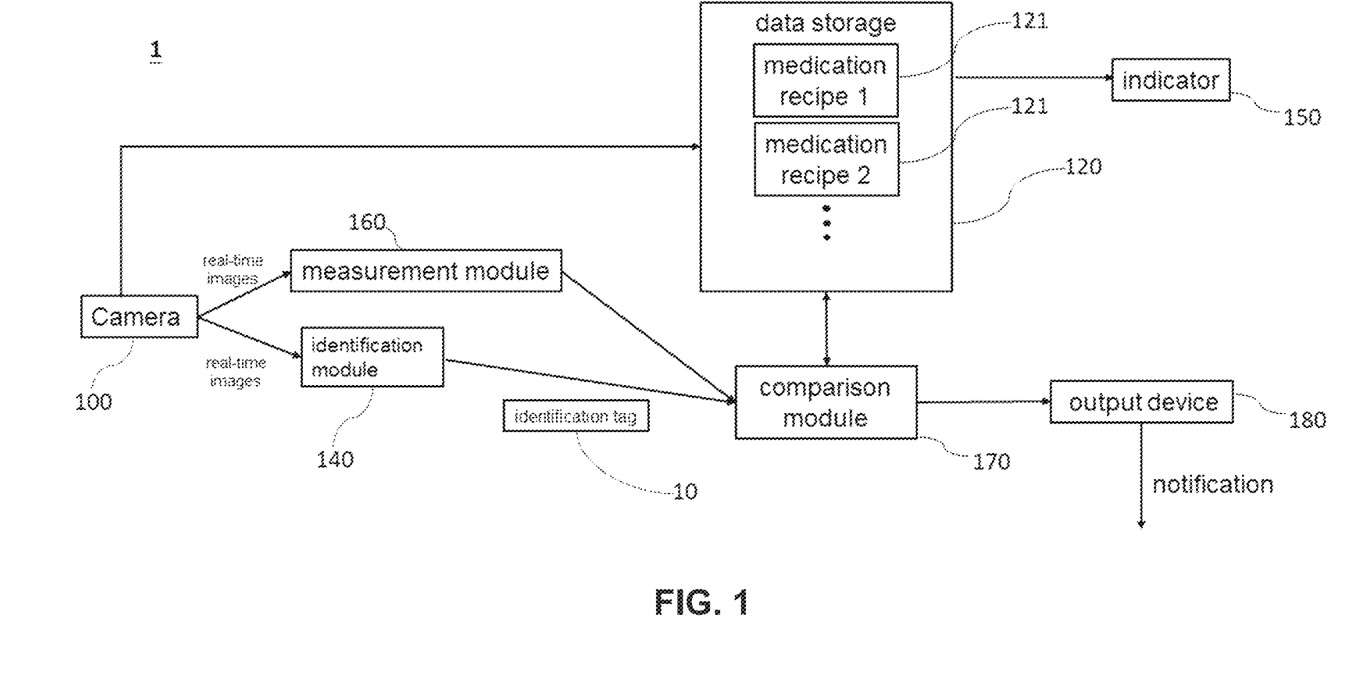
FIG. 1 is a schematic view of the first embodiment of the system for dispensing and compounding errors prevention.

With reference to FIG. 1, the system for dispensing and compounding errors prevention 1 comprises at least one camera 100, a data storage 120, an identification module 140, a measurement module 160, a comparison module 170, and an output device 180.

The camera 100 is provided for capturing or receiving the real-time images of personnel preparing the prescription. The camera 100 can be provided in plurality quantity so as to receiving the real-time images from different viewing angles. In some embodiments, different cameras 100 can be assigned for different functions. For examples, a camera 100 may be assigned for capturing and recording the real-time image of the entire process of prescription preparation, another camera 100 may be assigned to capture the real-time images of the container of a specific drug. In other embodiments, it is possible to provide a single camera 100 for capturing all the real-time images of the prescription preparation. It is worth mentioning that regardless of the quantity of the camera 100 provided, the camera 100 need to be able to receive all required information regarding the prescription preparation, which include the image of the container of the drug, the quantity of the drug dispended by the personnel, and all the procedures for preparing the prescription. The camera 100 may also have the function of zooming in/out to receive all required information mentioned above.

The data storage 120 is provided for storing a medication recipe 121 of a corresponding patient. As an example, the medication recipe 121 comprises the prescription prescribed to a particular patient. The medication recipe 121 may contain information such as the name and amount (quantity or volume) of a drug prescribed to the patient. The medication recipe 121 may contain a combination of different names and amount of drugs to be dispensed or compounded. Furthermore, in some embodiments, the medication recipe 121 may further comprise procedures for preparing the prescription. These procedures may include the order of steps for compounding drugs, and the sanitary, disinfection, or safety measures needed to be taken prior to prescription preparation, in between the steps of prescription preparation, or after prescription preparation. Each step may be associated with adding a particular drug to the medication compound. In some instances, the data storage 120 comprises a plurality of medication recipes 121 for different patients. These medication recipes 121 may be formed and provided to the data storage 120 via wire or wireless means after doctors prescribe prescriptions for their respective patients. The procedures for preparing the prescription contained in the medication recipes 121 may be pre-stored in the data storage 120 in the form of database. When a prescription for a patent is provided, the system for dispensing and compounding errors prevention 1 is able to associate the prescription (containing information of the medication) with corresponding procedures to form a medication recipe 121 and store the medication recipe 121 in the data storage 120. In some instances, the real-time images of the prescription preparation can also be stored in the data storage 120 for record. In some instances, the camera 100 can also capture still images periodically, at a particular instance, or on request for documentation of the prescription preparation for future reference. For example, the system for dispensing and compounding errors prevention 1 may take still images at a particular step of the prescription preparation to document the amount of drug dispensed by the personnel. As another example, still images may be taken by the camera 100 to document whether the correct procedures for prescription preparation are carried out.

The identification module 140 is provided for obtaining an identification tag 50 of a drug from a container of the drug or a physical appearance of the drug. The identification tag 50 mentioned herein refers to information which may be used to identify a specific drug. For example, the identification tag 50 may comprise information such as the name of the drug, the identification number or code of the drug, the physical appearance of the drug . . . etc. The physical appearance of the drug may include the color, size, and shape of a drug. In some embodiments, the identification tag 50 may also include the date of manufacturing of the drug. These information for identify a specific drug may be physically implemented in the labels, bar codes, or QR codes on the container of the drug. In some embodiments, the identification module 140 may be implemented as photoelectric device such as a barcode scanner, QR code scanner, or optical scanner for reading the information carried by the labels, bar codes, or QR codes on the container of the drug, and determine the information of the drug contained in the container. In this embodiment, the personnel can use the identification module 140 to directly scan the container of the drug so as to obtain the identification tag 50.

In other embodiments, the identification module 140 may be implemented and realized via image recognition system. The image recognition system may be able to identify and recognize texts, symbols, colors, geometric shapes from a still digital image or a stream of real-time images. The identification module 140 is in communication with the camera 100 via wire and wireless means. The identification module 140 receives the real-time images and obtains the identification tag 50 of the drug from labels on the container or from the physical appearance of the drug (when in tablet forms) from the real-time images by performing image recognition. In other words, the identification module 140 obtains the texts or symbols printed on the labels, or the shapes, sizes, and colors of the drug by processing the real-time images and perform image recognition on the images. The identification module 140 further obtains the identification tag 50 based on the image recognition results. The image recognition system may be artificial intelligence aided system which can be programmed and trained to gain image recognition capabilities. For example, the identification module 140 may comprise a convolutional neural network (CNN). CNN is a specialized neural network for processing data that has an input of 2D matrix, which can be used for image recognition and classification. The CNN runs mathematical operations which may have an input, an argument, and a kernel to perform image feature detection or classification based on the real-time images. In some embodiments, the CNN may have multiple feature detectors to perform different functions such as shape identification, or colors identification . . . etc. for determining the information on the label or for determining the physical shape of the drug when the drug is in tablet forms. In some embodiments of the present invention, the CNN may incorporate other models such as Yolov4 model for enhancing real-time object recognition capability. The CNN of the present invention can be trained and revised periodically from the server side for continue improving the object recognition and classification capability. As a result, the performance of the identification module 140 can be improved constantly.

The measurement module 160 is provided for determining an amount of the drug being dispensed by the personnel. The amount of the drug is related to a weight of the drug, a volume of the drug, or a tablet number of the drug prescribed. In some embodiments, the measurement module 160 may comprise a scale capable of measuring weight of the drug being dispensed by the personnel; in other embodiments, the measurement module 160 may comprise a pill counting device. Yet in another embodiment, the measurement module 160 may comprise a volume measurement means for determining the volume of drug (in liquid from) be dispensed.

Similar to the identification module 140, in other embodiments, the measurement module 160 may be implemented and realized via image recognition system. The image recognition system may be able to identify and recognize texts, symbols, colors, geometric shapes from a still digital image or a stream of real-time images. The measurement module 160 is in communication with the camera 100 via wire and wireless means. The measurement module 160 receives the real-time images and obtains the amount of drug dispensed by the personnel. In some instances, the measurement module 160 is able to read scale printed on the measuring glass and determined the volume dispensed from the real-time images. When the drug is in tablet form, the measurement module 160 is able to determine the number of pills dispensed via image recognition from the real-time images. In other words, for example, the measurement module 160 may obtain the texts or symbols printed on the measuring glass, or the number of drug process by the personnel while preparing prescription by processing the real-time images and perform image recognition on the images. The image recognition system may be artificial intelligence aided system which can be programmed and trained to gain image recognition capabilities, similar to that of the identification module 140. As a result, the performance of the measurement module 160 can be improved constantly.

Figure 2:
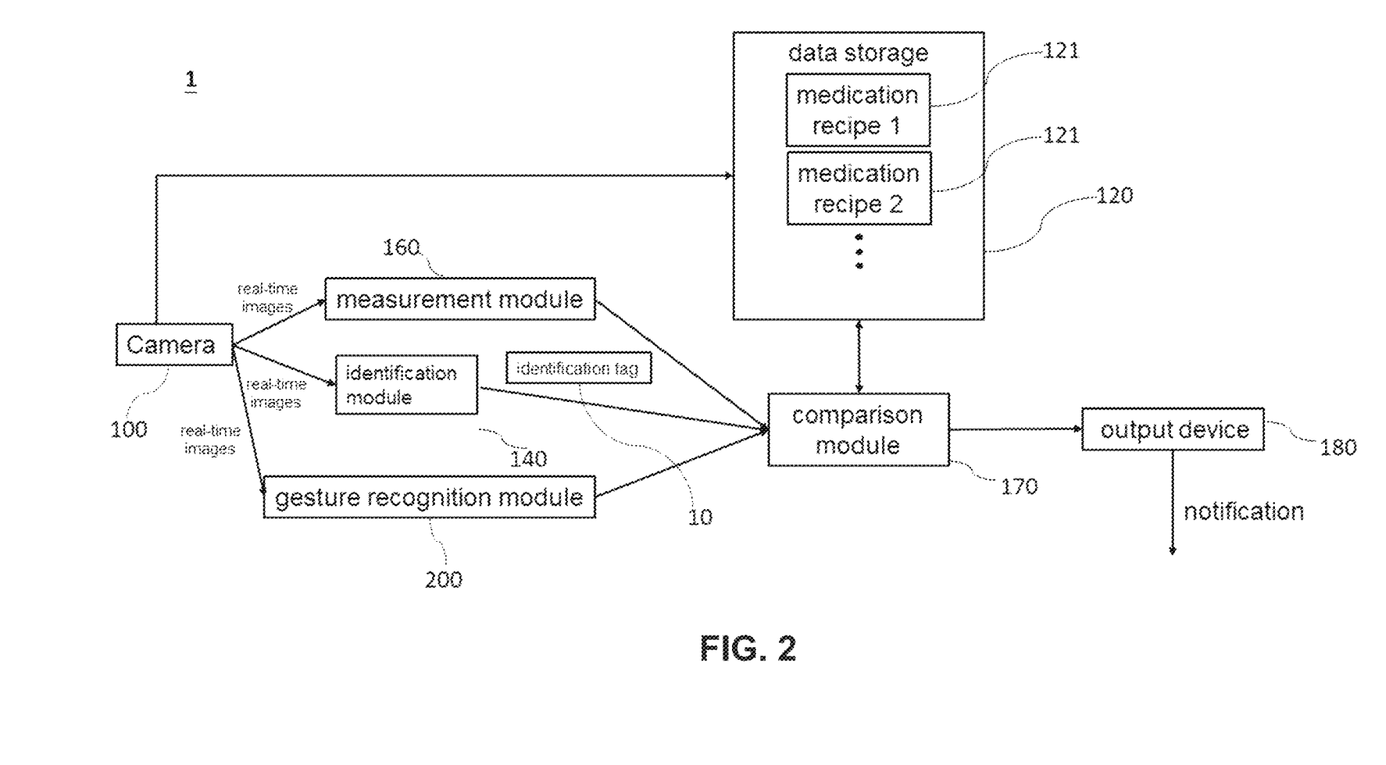
FIG. 2 is a schematic view of the second embodiment of the system for dispensing and compounding errors prevention.

With reference to FIG. 2, in some embodiments of the present invention, the system for dispensing and compounding errors prevention 1 in accordance with the present invention further comprises a gesture recognition module

200. The gesture recognition module 200 is in communication with the camera 100 and recognize the action, gesture, or task performed by the personnel via artificial intelligence aided image recognition system as mentioned above. As an example, the action, gesture, or task performed by the personnel may be cleaning the workstation, obtaining the drug container from the shelf . . . etc.

In one embodiment of the present invention, the system for dispensing and compounding errors prevention 1 further comprises an indicator 150. As mentioned earlier, each step of the procedure for preparing the prescription may be associated with adding a particular drug. The indicator 150 provides visual cues to the personnel regarding the location of the particular drug according to the procedures for preparing the prescription contained in the medication recipe 121. Thereby, the personnel preparing the prescription can obtain the correct drug from the correct location so as to prevent dispensing and compounding errors. For examples, the indicator 150 may be implemented as a light projector for projecting a light signal on the container of the particular drug; or the light projector may project the light signal in proximity to the location of the particular drug. In other embodiments, the drugs may be stored on a shelf. The indicator 150 may be incorporated with the shelf and emit a light signal in proximity to the location of the particular drug according to the procedures for preparing a prescription contained in the medication recipe 121.

Figure 3:
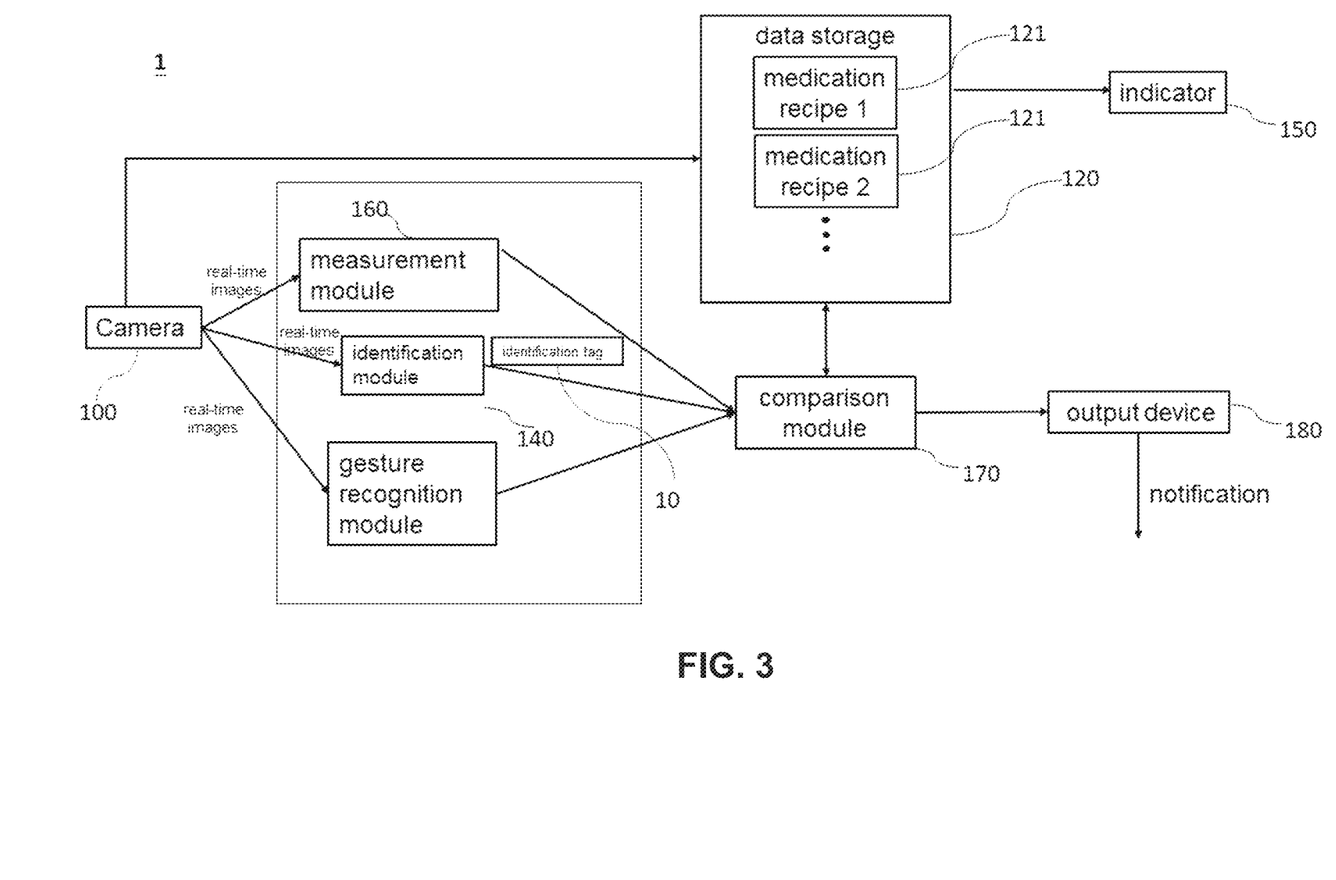
FIG. 3 is a schematic view of the third embodiment of the system for dispensing and compounding errors prevention.

With reference to FIG. 3, it is worth mentioning that in some embodiments of the present invention, the identification module 140 and the measurement module 160 are integrally provided for determining the identification tag 50 from the container of the drug, the physical appearance of the drug, or the amount of the drug being dispensed by the personnel based on the real-time images.

The comparison module 170 is in communication with the identification module 140, the measurement module 160 and the data storage 120. After the identification module 140 obtains the identification tag 50 of the drug and the measurement module 160 determines the amount of the drug being dispensed, the comparison module 170 receives the identification tag 50 and information regarding the amount to determine whether the identification tag 50 and amount of the drug match the medication recipe 121. As mentioned earlier, the medication recipe 121 may contain information regarding the procedures for preparing a prescription. These procedures may include the order of steps for dispensing and compounding drugs. Each step may be associated with adding a particular drug to the medication compound. The comparison module 170 compares the identification tag 50 and amount of the drug to a current active step of the medication recipe 121 to see whether the personnel is processing the correct drug with the correct amount for the current active step. If the personnel do not process the correct drug with the correct amount for the current active step, the comparison module 170 may activate an output device 180 for outputting a notification to the personnel. The notification can be a visual cue or an acoustic cue. In other embodiments, some steps may be related to, for example, disinfection or safety measures needed to be taken during the prescription preparation. The gesture recognition module 200 can also determine whether the personnel perform all the steps (e.g., safety measures) correctly via performing image recognition on the real-time images obtained by the camera 100. If the personnel ignore any steps, or do not perform the step correctly, the gesture recognition module 200 activate the output device 180 for outputting a notification to the personnel. The notification can be a visual cue or an acoustic cue.

In some embodiments, the system for dispensing and compounding errors prevention 1 in accordance with the present invention can be implemented through a remote centralized server; and a plurality of cameras 100 and a plurality of output device 180s are provided at different sites of different medication dispensing and compounding workstations. In this embodiment, the remote centralized server may comprise the data storage 120, the identification module 140, the measurement module 160, and the gesture recognition module 200 mentioned earlier. The cost for implementing the present invention can be greatly reduced; furthermore, the maintenance of the system can be facilitated.

Figure 4:
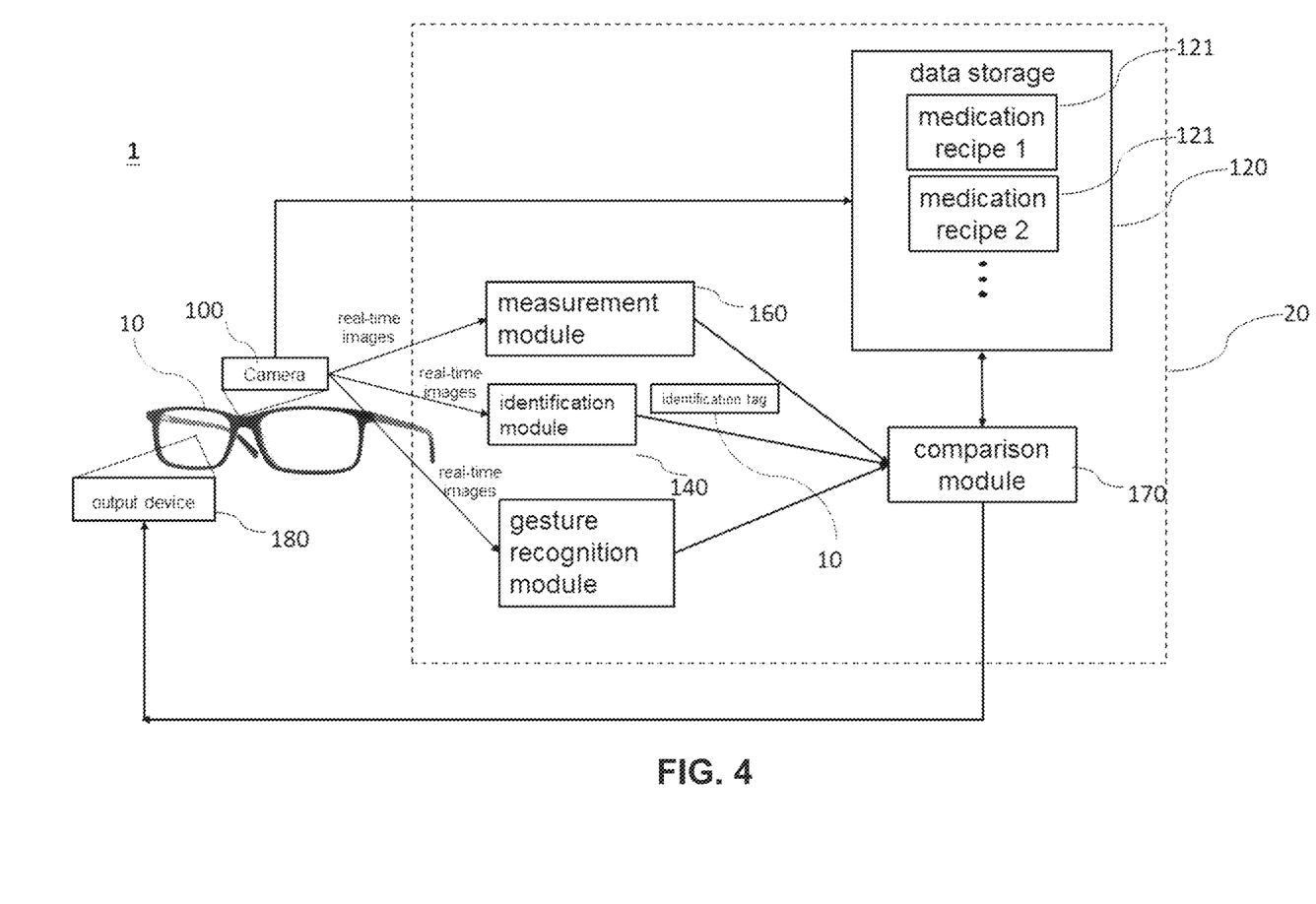
FIG. 4 is a schematic view of the fourth embodiment of the system for dispensing and compounding errors prevention.

In an embodiment of the present invention, the system for dispensing and compounding errors prevention 1 can be implemented via a server and a mobile device. The mobile device mentioned herein refers to cellphones, tablet computers or head wearable devices (e.g., AR glasses). The following will use AR glasses as an example to describe the current embodiment. In the current embodiment, the personnel wear the AR glasses while preparing the prescription. The AR glasses monitors and supervises the compounding process or prescription preparation performed by the personnel.

With reference to FIG. 4, the system for dispensing and compounding errors prevention 1 comprises a mobile device 10 (AR glasses). The AR glasses is worn by personnel preparing the prescription, the AR glasses comprises at least one camera 100, for receiving a real-time image of the personnel preparing the prescription. The system for dispensing and compounding errors prevention 1 further comprises a remote server 20, the remote server 20 is in communication with the AR glasses. The remote server 20 comprises a data storage 120, an identification module 140, a measurement module 160, and a comparison module 170.

The camera 100 is provided for capturing or receiving the real-time images of personnel preparing the prescription. The camera 100 can be provided in plurality quantity so as to receiving the real-time images from different viewing angles. In some embodiments, it is possible to provide a single camera 100 for capturing all the real-time images of the prescription preparation. It is worth mentioning that regardless of the quantity of the camera 100 provided, the cameras 100 need to be able to receive all required information regarding the prescription preparation, which include the image of the container of the drug, the quantity of the drug dispended by the personnel, and all the procedures for preparing the prescription.

The data storage 120 is provided for storing a medication recipe 121 of a corresponding patient. As an example, the medication recipe 121 comprises the prescription prescribed to a particular patient. The medication recipe 121 may contain information such as the name and amount of a drug prescribed to the patient. The medication recipe 121 may contain a combination of different names and amount of drugs to be dispensed or compounded. Furthermore, in some embodiments, the medication recipe 121 may further comprise procedures for preparing the prescription. These procedures may include the order of steps for compounding drugs, and the sanitary, disinfection, or safety measures needed to be taken prior to prescription preparation, in between the steps of prescription preparation, or after prescription preparation. Each step may be associated with adding a particular drug to the medication compound. In some instances, the data storage 120 comprises a plurality of medication recipes 121 for different patients. These medication recipes 121 may be formed and provided to the data storage 120 via wire or wireless means after doctors prescribe prescriptions for their respective patients. The procedures for preparing the medication contained in the medication recipes 121 may be pre-stored in the data storage 120 in the form of database. When a prescription for a patent is provided, the system for dispensing and compounding errors prevention 1 is able to associate the prescription (containing information of the medication) with corresponding procedures to form a medication recipe 121 and store the medication recipe 121 in the data storage 120. In some instances, the real-time images of the prescription preparation can also be stored in the data storage 120 for record. In some instances, the camera 100 can also capture still images periodically, at a particular instance, or on request for documentation of the prescription preparation for future reference. For example, the system for dispensing and compounding errors prevention 1 may take still images at a particular step of the prescription preparation to document the amount of drug dispensed by the personnel. As another example, still images may be taken by the camera 100 to document whether the correct procedures for prescription preparation are carried out.

The identification module 140 is provided for obtaining an identification tag 50 of a drug from a container of the drug or a physical appearance of the drug. The identification tag 50 mentioned herein refers to information which may be used to identify a specific drug. For example, the identification tag 50 may comprise information such as the name of the drug, the identification number or code of the drug, the physical appearance of the drug . . . etc. The physical appearance of the drug may include the color, size, and shape of a drug. In some embodiments, the identification tag 50 may also include the date of manufacturing of the drug. These information for identify a specific drug may be physically implemented in the labels, bar codes, or QR codes on the container of the drug. In the present embodiments, the identification module 140 may be implemented and realized via a remote image recognition system provided by the server. The image recognition system may be able to identify and recognize texts, symbols, colors, geometric shapes from a still digital image or a stream of real-time images. The identification module 140 is in communication with the camera 100 via wire and wireless means. The identification module 140 receives the real-time images and obtains the identification tag 50 of the drug from labels on the container or from the physical appearance of the drug (when in tablet forms) from the real-time images by performing image recognition. In other words, the identification module 140 obtains the texts or symbols printed on the labels, or the shapes, sizes, and colors of the drug by processing the real-time images and perform image recognition on the images. The identification module 140 further obtains the identification tag 50 based on the image recognition results. The image recognition system may be artificial intelligence aided system which can be programmed and trained to gain image recognition capabilities. For example, the identification module 140 may comprise a convolutional neural network (CNN), as mentioned earlier. The CNN may have multiple feature detectors to perform different functions such as shape identification, or colors identification . . . etc. for determining the information on the label or for determining the physical shape of the drug when the drug is in tablet forms. In some embodiments of the present invention, the CNN may incorporate other models such as Yolov4 model for enhancing real-time object recognition capability. The CNN of the present invention can be trained and revised periodically from the server side for continue improving the object recognition and classification capability. As a result, the performance of the identification module 140 can be improved constantly.

The measurement module 160 is provided for determining the amount of the drug being dispensed by the personnel. The amount of the drug is related to a weight of the drug, a volume of the drug, or a tablet number of the drug prescribed. The measurement module 160 may be implemented and realized via image recognition system. The image recognition system may be able to identify and recognize texts, symbols, colors, geometric shapes from a still digital image or a stream of real-time images. The measurement module 160 is in communication with the camera 100 via wireless means. The measurement module 160 receives the real-time images and obtains the amount of drug dispensed by the personnel. In some instances, the measurement module 160 is able to read scale printed on the measuring glass and determined the volume dispensed from the real-time images. When the drug is in tablet form, the measurement module 160 is able to determine the number of pills dispensed via image recognition from the real-time images. In other words, for example, the measurement module 160 may obtain the texts or symbols printed on the measuring glass, or the number of drug process by the personnel while preparing prescription by processing the real-time images and perform image recognition on the images. The image recognition system may be artificial intelligence aided system which can be programmed and trained to gain image recognition capabilities, similar to that of the identification module 140. As a result, the performance of the measurement module 160 can be improved constantly.

In some embodiments of the present invention, the system for dispensing and compounding errors prevention 1 in accordance with the present invention further comprise a gesture recognition module 200. The gesture recognition module 200 is in communication with the camera 100 and recognize the action, gesture, or task performed by the personnel via artificial intelligence aided image recognition system as mentioned above. As an example, the action, gesture, or task performed by the personnel may be cleaning the workstation, obtaining the drug container from the shelf . . . etc.

In one embodiment of the present invention, the system for dispensing and compounding errors prevention 1 further comprises an indicator 150. The indicator 150 may be incorporated with the display (not shown in the figures) of the AR glasses. As mentioned earlier, each step of the procedure for preparing the prescription may be associated with adding a particular drug. The indicator 150 provides visual cues to the personnel regarding the location of the particular drug according to the procedures for preparing the prescription contained in the medication recipe 121. Thereby, the personnel preparing the prescription can obtain the correct drug from the correct location so as to prevent dispensing and compounding errors. For examples, the display of the AR glasses may display a light signal such that the personnel wearing the AR glasses perceives the light signal at the location of the particular drug.

It is worth mentioning that in some embodiments of the present invention, the identification module 140 and the measurement module 160 are integrally provided for determining the identification tag 50 from the container of the drug, the physical appearance of the drug, or the amount of the drug being dispensed by the personnel based on the real-time images.

The comparison module 170 is in communication with the identification module 140, the measurement module 160 and the data storage 120. After the identification module 140 obtains the identification tag 50 of the drug and the measurement module 160 determines the amount of the drug being dispensed, the comparison module 170 receives the identification tag 50 and information regarding the amount to determine whether the identification tag 50 and amount of the drug match a specific medication recipe 121. As mentioned earlier, the medication recipe 121 may contain information regarding the procedures for preparing a prescription. These procedures may include the order of steps for preparing prescription. Each step may be associated with adding a particular drug to the medication compound. The comparison module 170 compares the identification tag 50 and amount of the drug to a current active step of the medication recipe 121 to see whether the personnel is processing the correct drug with the correct amount for the current active step. If the personnel do not process the correct drug with the correct amount for the current active step, the comparison module 170 may activate the AR glasses for outputting a notification to the personnel. The notification can be a visual cue or an acoustic cue. In other embodiments, some steps may be related to, for example, disinfection or safety measures needed to be taken during the prescription preparation. The gesture recognition module 200 can also determine whether the personnel perform all the steps (e.g., safety measures) correctly via performing image recognition on the real-time images obtained by the camera 100. If the personnel ignore any steps, or do not perform the step correctly, the gesture recognition module 200 activate the AR glasses for outputting a notification to the personnel.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A system for dispensing and compounding errors prevention comprising:
   at least one camera, for receiving a real-time image of a personnel preparing a prescription;
   a data storage, comprising a medication recipe of a corresponding patient;
   an identification module, for obtaining an identification tag of a drug from a container of the drug or a physical appearance of the drug;
   a measurement module, for determining an amount of the drug being dispensed by the personnel; and
   an indicator for providing a visual cue to the personnel, wherein the visual cue indicates a location of a particular drug, the indicator being a light projector,
   wherein the personnel receives a notification from the system for dispensing and compounding errors prevention when the amount of the drug being dispensed by the personnel does not match the medication recipe or when the identification tag of the drug does not match the medication recipe, wherein the notification is the visual cue.

2. The system for dispensing and compounding errors prevention of claim 1, wherein the identification module obtains the identification tag from the container of the drug, or the physical appearance of the drug based on the real-time image.

3. The system for dispensing and compounding errors prevention of claim 1, wherein the measurement module determines the amount of the drug being dispensed by the personnel based on the real-time image.

4. The system for dispensing and compounding errors prevention of claim 1, wherein the identification module is a photoelectric device for determining the identification tag of the drug by scanning the container of the drug.

5. The system for dispensing and compounding errors prevention of claim 1, the medication recipe comprising at least one identification tag of a drug and an amount of the drug, wherein the amount of the drug is a weight of the drug, a volume of the drug, or a tablet number of the drug.

6. The system for dispensing and compounding errors prevention of claim 5, the medication recipe further comprising procedures for preparing the prescription.

7. The system for dispensing and compounding errors prevention of claim 1, wherein the data storage stores the real-time image.

8. The system for dispensing and compounding errors prevention of claim 1, wherein the identification tag comprises information of a name of the drug and/or a date of manufacturing of the drug.

9. The system for dispensing and compounding errors prevention of claim 1, wherein the physical appearance of the drug comprises a shape of the drug, a size of the drug, and a color of the drug.

10. The system for dispensing and compounding errors prevention of claim 1, wherein the identification module and the measurement module are integrally provided for determining the identification tag from the container of the drug, the physical appearance of the drug, or the amount of the drug being dispensed by the personnel based on the real-time image.

* * * * *